United States Patent
Chen et al.

(10) Patent No.: US 6,651,024 B1
(45) Date of Patent: Nov. 18, 2003

(54) METHOD FOR AUTOMATIC TESTING PCMCIA CARDS

(75) Inventors: Tong S Chen, Taipei (TW); Kuang Shin Lin, Taipei (TW); Peng Li, Tianjin (CN); Bill Fan, Tianjin (CN)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/484,211

(22) Filed: Jan. 18, 2000

(51) Int. Cl.$^7$ .............................. G06F 19/00; G06F 3/00
(52) U.S. Cl. ........................ 702/119; 702/186; 710/13
(58) Field of Search ............................... 702/119, 186; 710/8, 13, 15, 101

(56) References Cited

U.S. PATENT DOCUMENTS

| | | | | |
|---|---|---|---|---|
| 5,696,970 A | * | 12/1997 | Sandage et al. | ............ 709/324 |
| 5,881,221 A | * | 3/1999 | Hoang et al. | ................. 714/42 |
| 6,041,363 A | * | 3/2000 | Schaffer | ...................... 709/321 |
| 6,370,594 B1 | * | 4/2002 | Chang et al. | ................. 710/3 |
| 6,434,648 B1 | * | 8/2002 | Assour et al. | ............. 710/305 |
| 2002/0170000 A1 | * | 11/2002 | Gorodetsky et al. | .......... 714/30 |

OTHER PUBLICATIONS

Internet Web page entitled "PCMCIA: Analyzer 'MPAX PCMCIA' from Computer Bus Tools" at www.bustools.com, date unknown.*
Internet Web page entitled "TestMetrix Product Line, PCMCIA Cart Tester" at www.testmetrix.com, date unknown.*
Internet Web page entitled "Bus Doctor Analyzers from Data Transit" at www.datatransit.com, date unknown.*

* cited by examiner

*Primary Examiner*—Patrick Assouad
(74) *Attorney, Agent, or Firm*—Birch, Stewart, Kolasch & Birch, LLP

(57) ABSTRACT

This specification discloses a method for automatic testing PCMCIA cards. The method first loads in the main library of the control panel, then checks and displays the PCMCIA module using the application interface of the control panel library. A SetwindowsHook then loads in dynamic link library (DLL) and checks the TextOut function address from the ModuleList in PCMCIA module for interception and data storage. The peripheral description values are stored in a list and compared with the data intercepted and stored in the ModuleList to complete a test report on correctness or error.

12 Claims, 5 Drawing Sheets

METHOD FOR AUTOMATIC TESTING PCMCIA CARDS

FIELD OF INVENTION

The present invention relates to a method for testing PCMCIA cards and, in particular, to a method for automation of testing PCMICA cards.

RELATED ART

Personal computer memory card international association (PCMCIA) is a memory card standard set by the United States of America and Japan, which sets the connection standard for the peripheral devices of a portable computer. PCMCIA also has the design of conversion to other interfaces, such as PCMCIA to SCSI, PCMCIA to IDE, etc, so as to allow the portable computer to use various interfaces of personal computers. Currently, there are three different interfaces on portable computers, namely, PCMCIA I, PCMCIA II, and PCMCIA III. The thickness of a PCMCIA III card is twice that of a PCMCIA II card, and the PCMCIA card is the thinnest. The main function of a PCMCIA card is to expand the capability of a portable computer so that the memory, network card, modem, SCSI devices (such as high capacity hard drives, scanners) can be connected thereon. A usual PCMCIA cards has capacity up to 64 MB, a size of a credit card, 16 bit slot and 68 pins; yet the thickness varies from computers to computers. Most portable computers support the plug-and-play function, some even support the hot-plug function (direct use without rebooting).

Recently, portable computer manufacturers are developing a new generation of PC card standard, which utilizes a 32 bit CardBus and 20/33 MHz pulse to support 132 MBps transmission rate. Basically, it is using the technology of PCI buses to provide PCMCIA interfaces for a portable computer that also have 68 pins.

The connection standard of peripherals set in PCMCIA has three levels of communications, namely, the driver level, the interface card service level, and the socket service level. The programs that support PCMCIA standard have to define and call the functions of each level according to this standard. The calling method of a conventional PCMCIA program is vertical. The application program used by the user first calls the driver level, which then calls the interface service level and the socket service in order so as to communicate with the hardware level with a personal computer interface control (PCIC). The driver level serves the drivers of all peripheral, such as the modem, network card, and CD-ROM. The socket service level functions as the BIOS in a personal computer (PC) and is in charge of the communication with low level devices, such as the settings of I/O ports and IRQs. The interface card service level plays the role of the operating system of a PC and provides services unrelated to hardware, calls the socket service level, but is not in direct communication with the hardware interface.

In each level of calling, the interface card service level and the socket level can use the software developed or designed by the programmers, nevertheless, the functions of the driver level for calling have to be designed according to the specifics of the interface card level and the socket level. This is a great difficulty for the drivers that do not support the PCMCIA card. Since to rewrite the drivers to support the PCMCIA card, the programmer has to learn the PCMCIA standard and gets familiar with how to use the functions called by PCMCIA. This task requires extra work and time. Therefore, a complete standardized test report of the specifics, the types, and the accompanying peripherals for the users is very important. Gauging a set of procedure for testing PCMCIA cards and generating a standardized report are relatively important too.

As to the method for testing PCMCIA cards, conventional methods perform manual tests that do not only waste time and human resources but also do not have a gauged test method. Thus the efficiency and test accuracy could not be increased, and a corresponding test report could not be generated according to the user's requirement either.

SUMMARY OF THE INVENTION

The present invention provides a method for automatic testing PCMCIA cards, which can not only resolve the problems of wasting time and human resources in the traditional manual testing method but also gauges a testing method for high efficiency and test accuracy and generates a corresponding test report pursuant to the user's need.

The main operation flow module of a method for automatic testing PCMCIA cards according to the instant invention comprises a control panel library (CPL), a display data interception module, a registration database retrieval module, a comparison module, and a final report generator module.

First loaded is the control panel library. The application interface of the control panel library checks and displays the PCMICA module. A SetwindowsHook then loads in dynamic link library (DLL) and checks the TextOut function address from the ModuleList in PCMCIA module for interception and data storage. The peripheral description values are stored in a list and compared with the data intercepted and stored in the ModuleList to complete a test report on correctness or error.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
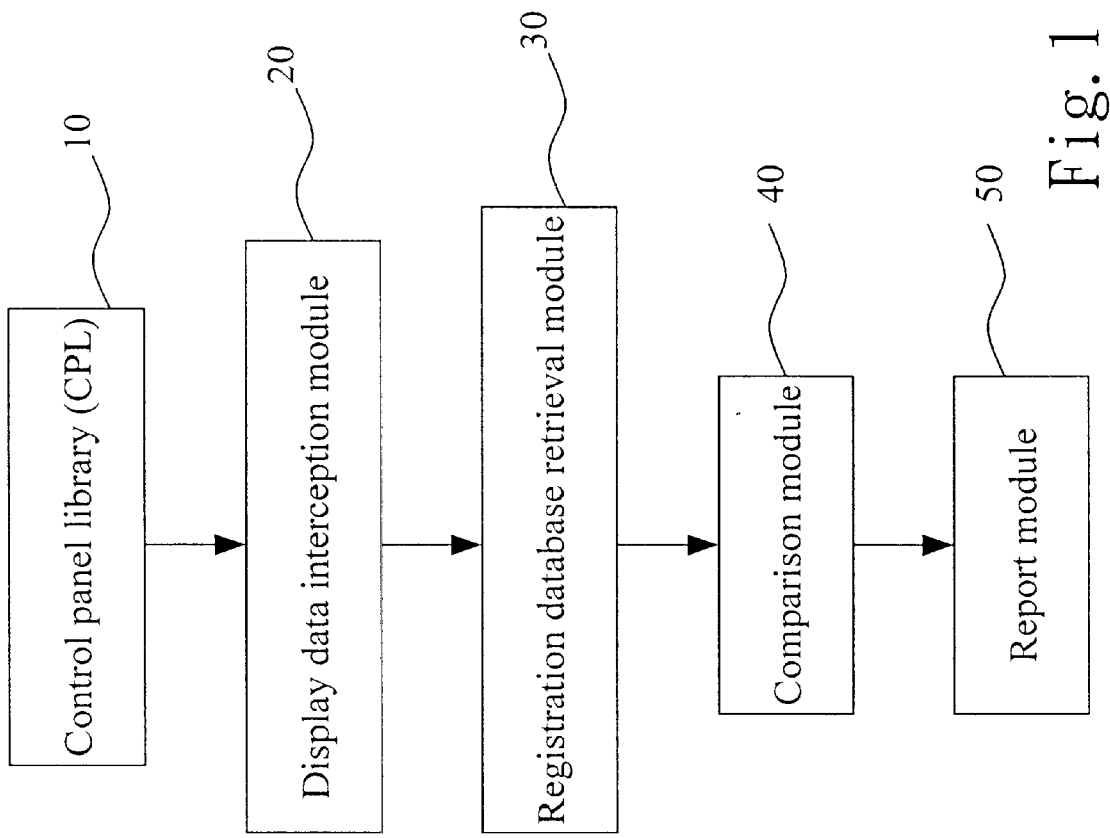
FIG. 1 is a schematic view of the function module according to the present invention.

The instant invention provides a procedure for automatic testing PCMCIA cards, whose main operation flow is shown in FIG. 1. It comprises a control panel library (CPL) module 10, a display data interception module 20, a registration database retrieval module 30, a comparison module 40, and a report module 50. Each of the above modules is explained in further detail hereinafter.

Figure 2:
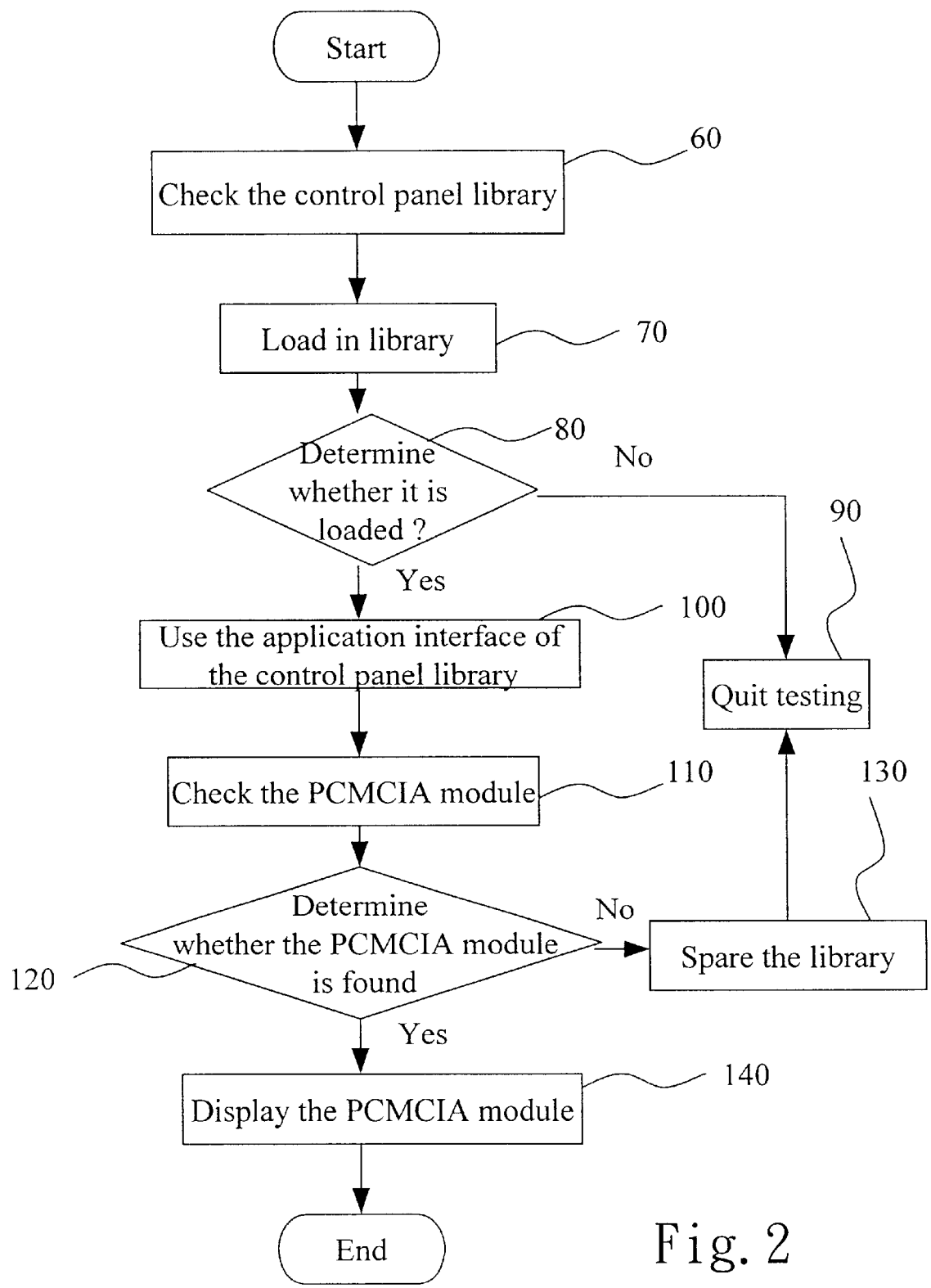
FIG. 2 is a flow chart of the control panel library according to the present invention.

FIG. 2 is a flow chart of the control panel library (CPL) according to the present invention. A PCMCIA card procedure first starts. Then the method checks the control panel main library (step 60) to load in the library (step 70). It is determined whether thew library is loaded (step 80). If not, then the method quits testing (step 90); otherwise, an application interface of the control panel library is employed (step 100) to check the PCMCIA module (step 110) and determine if the module is found (step 120). If it is not found, then the method spares the library (step 130) and quits testing (step 90); otherwise, the PCMCIA module is displayed (step 140) to complete the flow of the control panel module (CPL). At this moment, the CPL would display interface data of a PCMCIA card.

Figure 3:
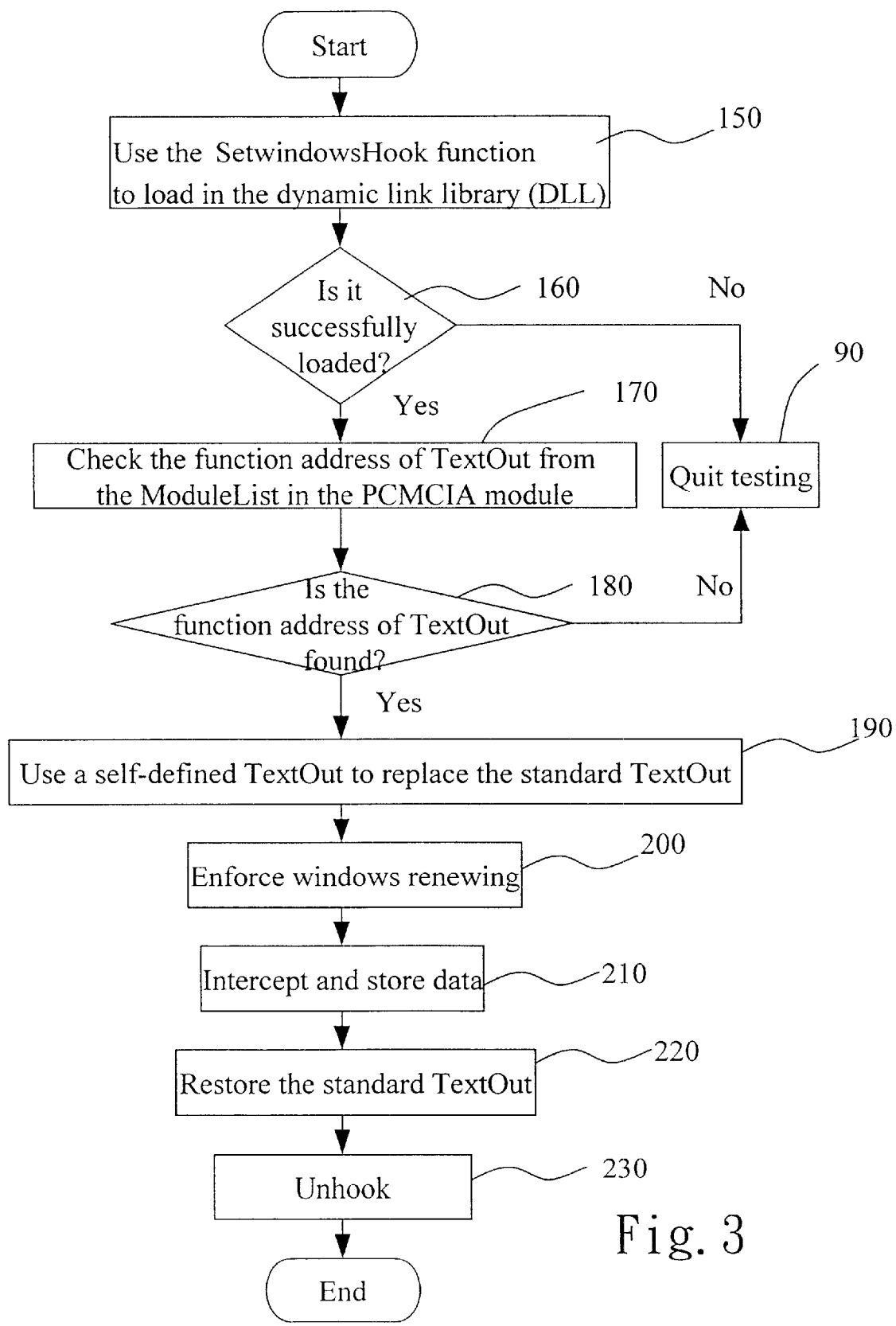
FIG. 3 is a flow chart of the display data interception module according to the present invention.

Then the method intercepts the interface data of the above displayed PCMCIA card. FIG. 3 is a flow chart of the display data interception module according to the present invention. A SetwindowsHook function is used to load in dynamic link library (DLL) (step 150). It is determined whether the DLL is successfully loaded (step 160). If not, then the method quits testing (step 90); otherwise, the method checks the function address of TextOut in the PCMCIA ModuleList (step 170). It is then determined whether the function address of TextOut is found (step 180). If not, then the method quits testing (step 90); otherwise, a self-defined TextOut is used to replace the standard TextOut (step 190). Afterwards, the method enforces windows renewing (step 200), intercepts and stores data (step 210), and restores the standard TextOut (step 220) after the data storage. Finally, the method unhooks (step 230) to complete the procedure of the display data interception module.

The following testing procedure is to store all description data related to peripheral devices in a list for comparison with the intercepted and stored data in step 210. This procedure implements the goal of automatic testing.

Figure 4:
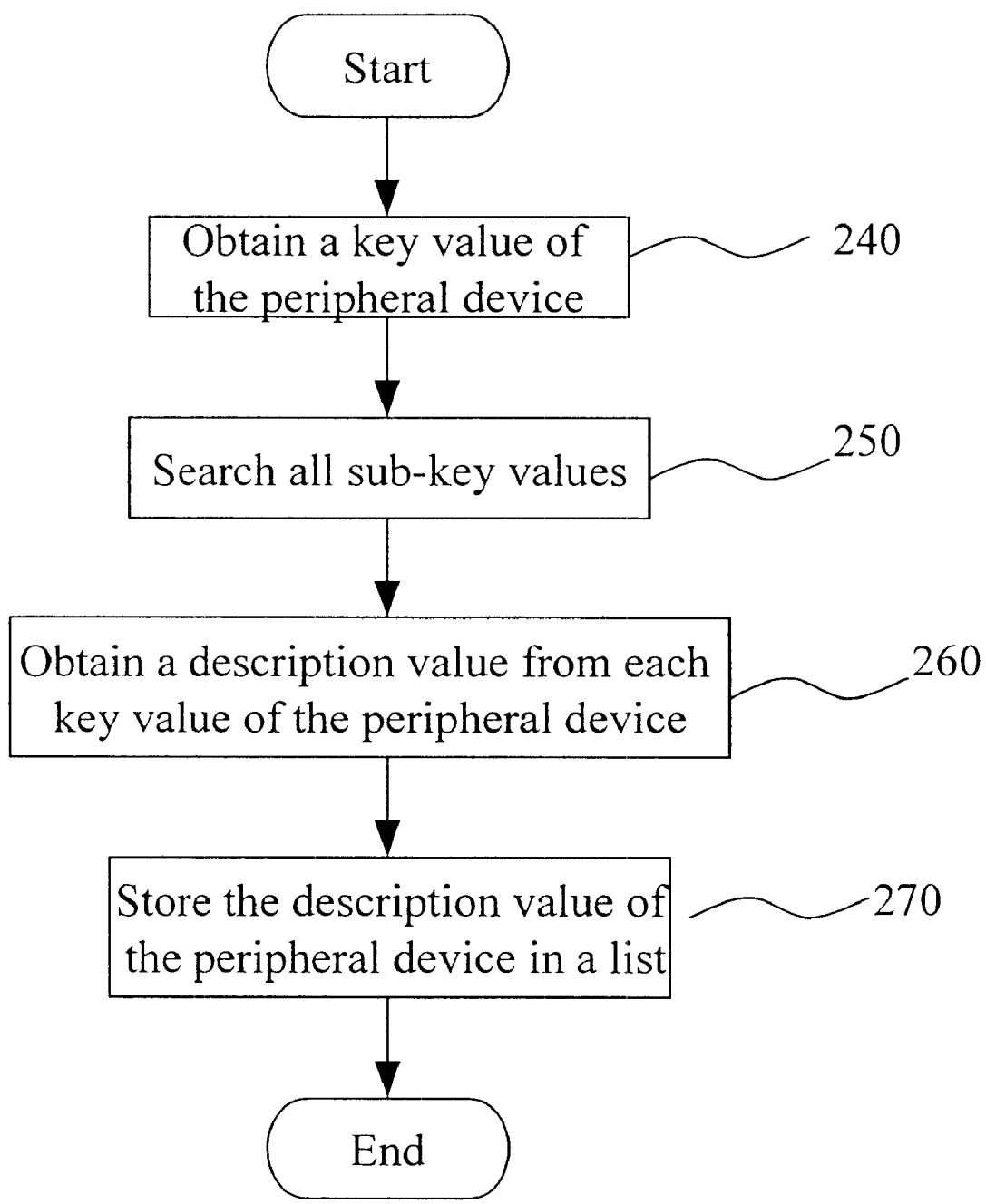
FIG. 4 is a flow chart of the registration database retrieval module according to the present invention.

FIG. 4 is a flow chart of the registration database retrieval module according to the present invention. The module first obtains a key value of the peripheral device (step 240), then searches all sub-key values (step 250). The description value of the peripheral device is retrieved from each of the key values (step 260). Finally, the description value of the peripheral device is stored in a list (step 270) to complete the procedure of the registration database retrieval module.

Figure 5:
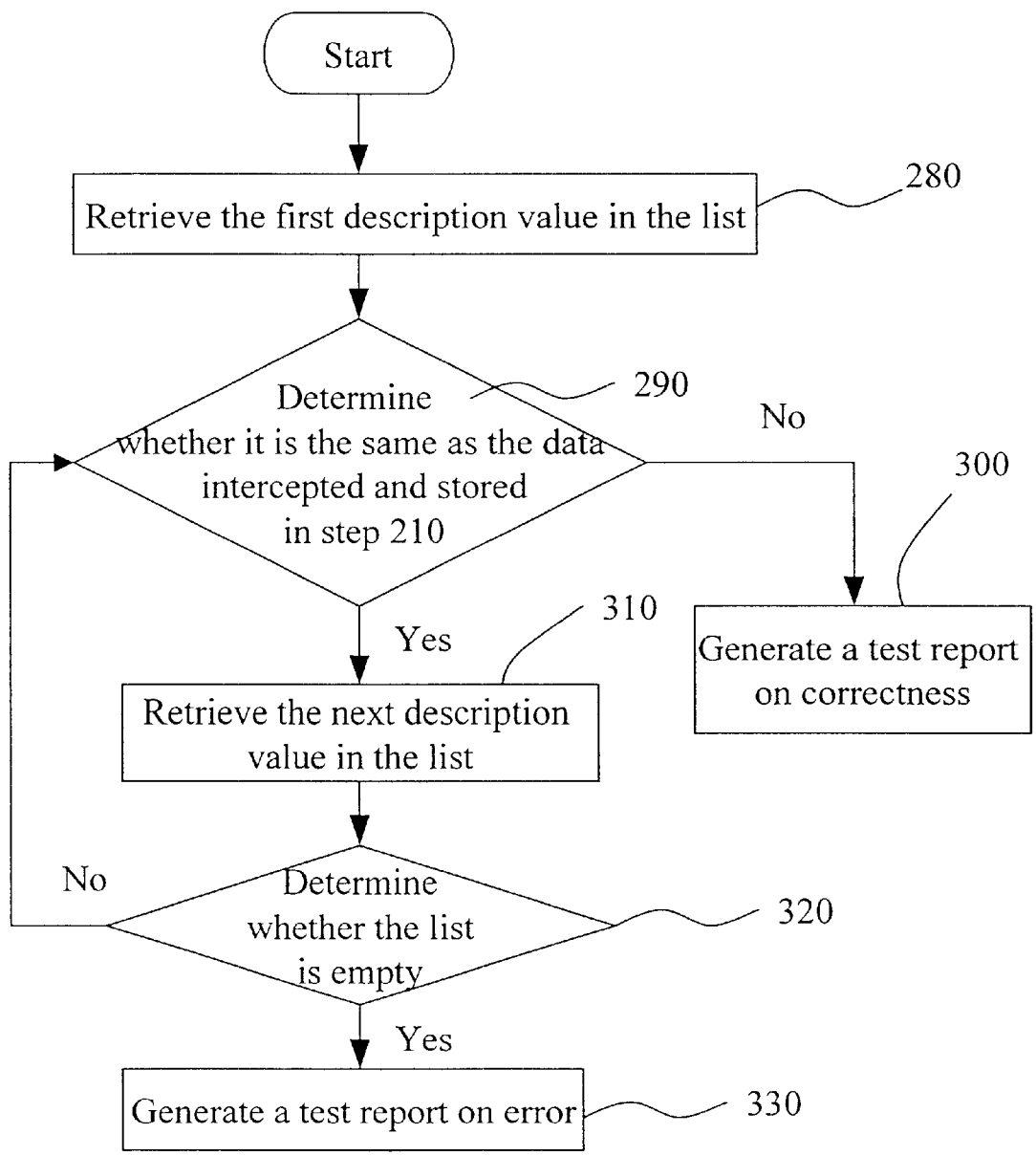
FIG. 5 is a flow chart of the comparison module according to the present invention.

At this moment, the procedure for automatic testing PCMCIA cards enters the last comparison procedure. FIG. 5 is a flow chart of the comparison module according to the present invention. The first description value is first retrieved from the list (step 280). It is determined whether the description value is the same as the data intercepted and stored in step 210 (step 290). If it is, then the module generates a test report on correctness (step 310). Otherwise, the next description value is retrieved from the list and it is determined whether the list is empty (step 320). If it is, then the module generates a test report on error (step 330); otherwise, the procedure returns to step 290 to execute comparison for the next description value.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for automatic testing PCMCIA cards, which method comprises the steps of:

providing a control panel library (CPL) module, via the application interface of which the PCMCIA module can be checked and displayed;

providing a display data interception module for intercepting and storing TextOut in a ModuleList of the PCMCIA;

providing a registration database retrieval module for storing a description value of a peripheral device in a list;

providing a comparison module, which compares the peripheral description value stored in the list with the TextOut intercepted and stored in the PCMCIA ModuleList; and generating a report module for displaying a test report on correctness or error for the PCMCIA card.

2. The method for automatic testing PCMCIA cards of claim 1, wherein the interception and storage of the TextOut is accomplished using a SetwindowsHook function to load in dynamic link library (DLL).

3. The method for automatic testing PCMCIA cards of claim 1, wherein the TextOut is obtained by replacing the standard TextOut with a self-defined TextOut.

4. The method for automatic testing PCMCIA cards of claim 1, wherein the peripheral device description value is retrieved from the peripheral device key value.

5. A method for automatic testing PCMCIA cards, which has the features that a control panel library (CPL) module checks and displays a PCMCIA module; that a display data interception module intercepts and stores data in a PCMCIA ModuleList; and that the data are compared with data in a registration database retrieval module for generating a report by a report module.

6. The method for automatic testing PCMCIA cards of claim 5, wherein the check and display of the PCMCIA module are accomplished by the application interface of the control panel library (CPL) module.

7. The method for automatic testing PCMCIA cards of claim 5, wherein the data in the PCMCIA ModuleList are TextOut.

8. The method for automatic testing PCMCIA cards of claim 7, wherein the TextOut is accomplished with a SetwindowsHook function which loads in dynamic link library (DLL).

9. The method for automatic testing PCMCIA cards of claim 7, wherein the TextOut is a self-defined TextOut instead of a standard TextOut.

10. The method for automatic testing PCMCIA cards of claim 5, wherein the data in the registration database retrieval module are description values of peripheral devices.

11. The method for automatic testing PCMCIA cards of claim 10, wherein the description value of a peripheral device is obtained from the key value of the peripheral device.

12. The method for automatic testing PCMCIA cards of claim 5, wherein the report module displays the PCMCIA test report on correctness or error.

* * * * *